March 25, 1969
W. B. SHAFFER
3,435,177
SERVO CONTROL CIRCUIT FOR ELECTRICAL DISCHARGE
MACHINING APPARATUS
Filed March 9, 1966
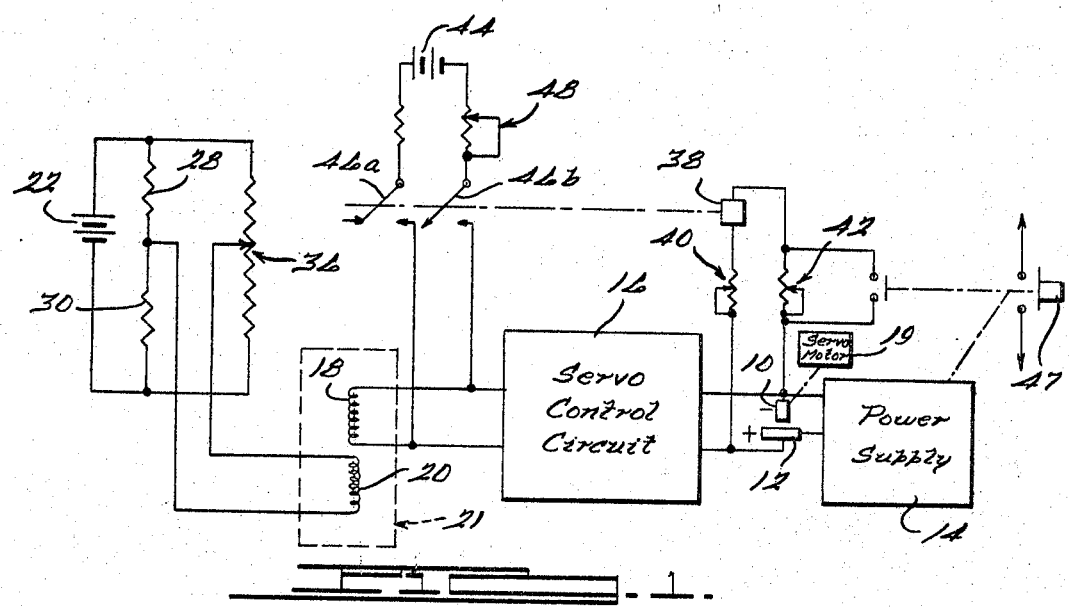
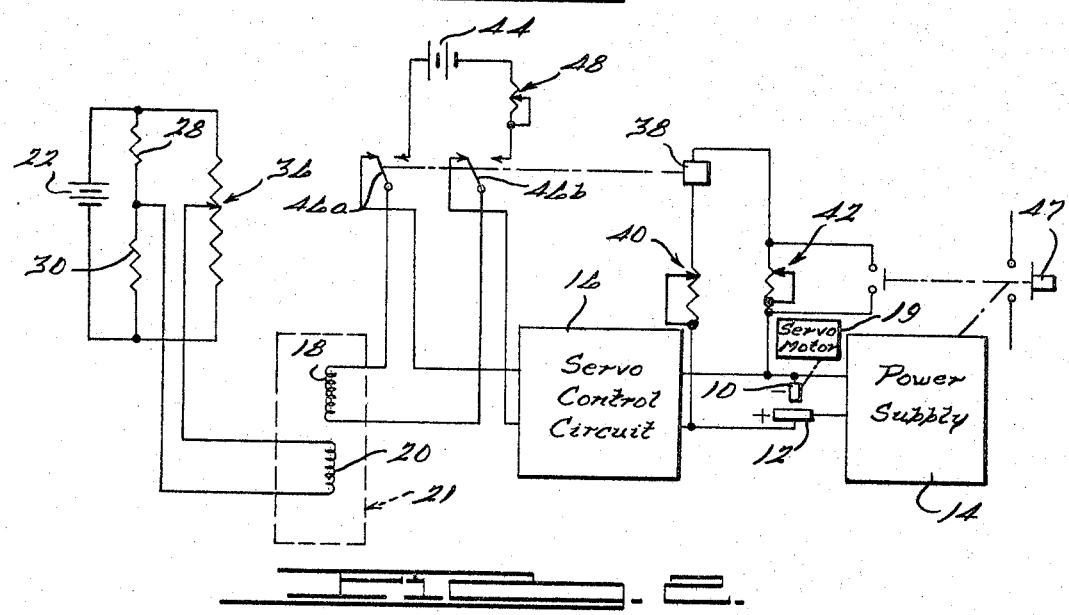
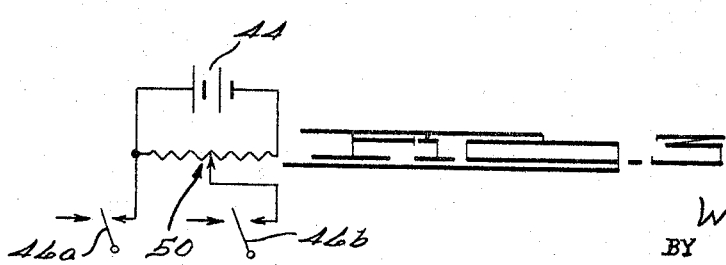
INVENTOR.
William B. Shaffer
BY
Harry R. Dumont
ATTORNEY.

United States Patent Office 3,435,177
Patented Mar. 25, 1969

---

3,435,177
SERVO CONTROL CIRCUIT FOR ELECTRICAL DISCHARGE MACHINING APPARATUS
William B. Shaffer, Grosse Pointe Woods, Mich., assignor, by mesne assignments, to Elox Inc., Troy, Mich., a corporation of Delaware
Filed Mar. 9, 1966, Ser. No. 532,975
Int. Cl. B23k 9/10
U.S. Cl. 219—69                                       7 Claims

---

ABSTRACT OF THE DISCLOSURE

A rapid approach servo feed control circuit for electrical discharge machining apparatus in which initial high velocity approach is provided by a high voltage superimposed downfeed D.C. source. The downfeed source is removed upon initial gap breakdown between workpiece and electrode.

---

A problem encountered in servo feed systems for electrical discharge machines is that normal control settings for optimum cutting conditions involve a relatively low servo feed rate. This necessarily involves a relatively long approach time on initial downfeed.

It is an object of this invention to provide a new and improved servo system for electrical discharge machining in which, during initial downfeed or approach, a relatively high feed rate is maintained, which rate is immediately reduced upon a predetermined voltage drop across the gap to provide normal servo feed operation.

It is an additional object of this invention to provide a new and improved rapid approach servo feed circuit for electrical discharge machining in which a voltage of the downfeed or approach level is superimposed on the normal servo downfeed signal for providing fast approach.

It is a further object of this invention to provide a new and improved rapid approach servo feed circuit for electrical discharge machining in which a downfeed level voltage is first applied to the control circuit on initial downfeed which voltage is then removed and replaced by the normal servo feed control circuit.

My invention, together with its advantages, will be better understood by reference to the accompanying drawings, in which:

FIGURE 1 is a combined schematic and block diagram representation of the invention;

FIGURE 2 is a drawing substantially similar to FIGURE 1 showing an alternate form of the invention; and FIGURE 3 is a schematic showing of a different embodiment of the imposed voltage circuit.

With more particular reference to FIGURE 1, the tool electrode 10 is normally advanced toward the electrically conductive workpiece 12 with a dielectric coolant flow being maintained in the gap. A power supply 14 is utilized to furnish machining pulses across the gap to electrically remove workpiece particles therefrom. One example of a power supply suitable for producing high frequency machining pulses across the gap is shown and described in Porterfield et al. U.S. Patent 3,089,059, issued May 7, 1963. In order to control the gap spacing between electrode 10 and workpiece 12 and to maintain this spacing at an optimum during machining, a servo control circuit 16 is employed which, responsive to a gap parameter representative of gap spacing, provides bidirectional current flow through a suitable electrohydraulic valve control coil 18 to control the backup or downfeed of the electrode 10. An example of a suitable servo feed circuit and apparatus is shown and described in Webb Reissue No. 25,580, issued on May 19, 1964. When the gap spacing is relatively large, the voltage sensed in the gap will be relatively high and of a level to initiate downfeed. When the gap spacing becomes relatively small or gap short circuit occurs, there will occur a substantial drop in gap voltage to a level which will initiate electrode backup to permit continuance of proper machining across the appropriate gap spacing. Electrohydraulic servo motor 19 is shown as the motive means for providing relative movement between electrode 10 and workpiece 12 with electrode 10 being advanced downwardly as machining progresses. In certain applications, the position of electrode and workpiece may be reversed with workpiece 12 being operatively connected to and controlled by electrohydraulic servo motor 19 to provide the necesary relative movement. It will be understood that the present invention is equally applicable to a servo system employing an electric motor as the motive means. Coil 18 is the electrically energized control element for servo valve 21 and coil 20 is the balancing coil. Servo valve 21 is used to control the operation of servo motor 19 responsive to the flow of current through servo coil 18 in a manner well known in the art. An adjustable balancing circuit is provided for manual control and balancing of servo valve 21. The balancing circuit comprises a D.C. source 22 which is illustrated as a D.C. supply but might also be derived from the main machining power supply included in power supply 14. Also included in the balancing circuit are a pair of substantially equal value, relatively low impedance resistors 28, 30, connected in series as shown across D.C. source 22. A linear potentiometer 36 is also connected across D.C. source 22 with its resistor having a relatively high impedance value as compared to the value of the resistors hereinbefore referred to. The ratio of the impedance of the resistor of potentiometer 36 to that of resistors 28, 30, taken singly, is ideally within the range of 3 to 1 or 10 to 1. In order to achieve a null adjustment of the system, movable contacts of potentiometer 36 may be removed upwardly or downwardly by the operator as required.

To provide the rapid approach feature, electromagnet relay coil 38 is connected across the gap in series with potentiometers 40 and 42. Potentiometer 40 provides a coarse adjustment to set relay 38 to the open circuit voltage provided by power supply 14 across the gap. Potentiometer 42 is set at a magnitude such that with relay 38 energized and pulled up, a predetermined drop in gap voltage will be sufficient to deenergize relay 38 and drop it out. Relay 38 is employed to selectively connect an impressed voltage source, DC source 44, of the appropriate downfeed level or polarity, across servo coil 18. The coil of relay 38 controls movable contacts 46a and 46b in the manner shown. A common operating means such as cycle start switch 47, may be utilized to initiate simultaneously the operation of relay 38 and the connection of power supply 14 across the machining gap.

FIGURE 2 shows an alternate embodiment of the present invention similar in many respects to that of the circular of FIGURE 1. The principal difference is the manner in which rapid approach DC voltage source 44 is connected across coil 18. Relay contacts 46a and 46b are connected so that in their left-hand position in the energized condition of relay coil 38, DC source 44 is impressed across the coil 18 to provide rapid approach. In the right-hand position of contacts 46a, 46b, in the deenergized condition of relay coil 38, the output of servo control circuit 16 is connected across coil 18 while DC source 44 is disconnected from across coil 18. A potentiometer 48 is connected in series with DC source 44 for selective adjustment of the magnitude of the voltage impressed across servo coil 18 to provide rapid approach.

FIGURE 3 illustrates a different circuit arrangement for the impressed voltage source in which a potentiometer 50 has its variable resistance connected in shunt with with DC source 44 to provide wide range variation of the impressed voltage magnitude.

*Description of operation*

With reference to FIGURE 1, the cycle is begun by activating cycle start switch 48 to provide a relatively high open circuit machining voltage across the gap comprising electrode 10 and workpiece 12. At the same time, relay coil 38 is energized to move contacts 46a, 46b to their right-hand position, thereby connecting the voltage of DC source 44 across servo coil 18. This provides a superimposed voltage of the proper polarity to initiate a relatively rapid advance rate of electrode 10 toward workpiece 12. As soon as electrode 10 approaches within close proximity to workpiece 12, gap ionization and discharge will occur causing a sudden voltage drop which voltage drop across relay 38 will cause it to drop out, thus moving contacts 46a, 46b to their left-hand position. At this point, normal servo operation is instituted. In some instance, the predetermined voltage drop across the gap sufficient to deenergize relay 38 will occur prior to actual contact between electrode and workpiece. Alternately, actual contact may occur with the fast approach operation interrupted and normal servo feed provided as soon as contact is accomplished on initial downfeed. With reference to FIGURE 2, the operation of cycle start switch 48 and relay coil 38 are substantially similar to the operation as described in connection with FIGURE 1. The principal difference is that the impressed voltage magnitude supplied by DC source 44 is applied separately across control coil 18 rather than superimposed upon the normal servo control voltage output as was the case in FIGURE 1.

While the present invention has been illustrated in conjunction with electrical discharge machining servo feed apparatus, the invention will be seen not be limited to this environment but equally applicable to any servo feed system of the electrically operated and closed loop type. The present invention is of particular importance in the general field of electrical machining which field also includes the process of electrochemical machining in which, in a manner similar to electrical discharge machining, metal is removed by an electrical machining operation across a machining gap. Electrochemical machining differs from electrical discharge machining in that the power supply is usually steady state current rather than pulsating and the machining fluid used is an electrolyte rather than a dielectric.

It will thus be seen that I have provided a new and improved servo control circuit in which a rapid approach operation is applied where required with normal velocity servo operation made effective at the appropriate point of operation.

I claim:

1. In an apparatus for machining a conductive workpiece by electrical discharge from a power supply across a dielectric coolant filled gap between a tool electrode and said workpiece including a motive means for providing relative movement between said electrode and workpiece, a servo feed system comprising an electrically energized element operatively connected to and controlling the operation of said motive means, means for providing an electrical voltage output to said element representative of gap spacing, said voltage output of a level effective to provide normal velocity relative approach between said electrode and workpiece, a separate DC voltage source for impressing an additional voltage of a substantially higher level on said element of a polarity and a magnitude to provide high velocity approach, and means for connecting said source directly across said element for rapid approach and for disconnecting said source responsive to initial discharge occurring across said gap.

2. The combination as set forth in claim 1 wherein said last-mentioned means comprises an electromagnetic relay and wherein said voltage source is operatively connectable to said element through the contacts of said relay.

3. The combination as set forth in claim 2 in which a potentiometer is connected with its variable resistance across said voltage source for selective adjustment of its magnitude.

4. In an apparatus for machining a conductive workpiece by electrical discharge from a power supply across a dielectric coolant filled gap between a tool electrode and said workpiece including a motive means for providing relative movement between said electrode and workpiece, a servo feed system comprising an electrically energized element operatively connected to and controlling the operation of said motive means, means for providing an electrical voltage output to said element representative of gap spacing, said voltage output of a first level effective to provide normal velocity relative approach between said electrode and workpiece, a separate voltage source for impressing an additional voltage on said element of a polarity and a magnitude at a substantially higher level to provide rapid approach, and means for connecting said source directly across said element on initial approach and for disconnecting it from across said element responsive to initial contact between said electrode and workpiece.

5. In an apparatus for machining a conductive workpiece by electrical discharge from a power supply across a dielectric coolant filled gap between a tool electrode and said workpiece including a motive means for providing relative movement between said electrode and workpiece, a servo feed system comprising an electrically energized element operatively connected to and controlling the operation of said motive means, a first control means for providing an electrical voltage output to said element representative of gap spacing, said output of a level effective to provide normal velocity relative approach between said electrode and workpiece, a separate DC source of a polarity and magnitude of a substantally higher level to provide rapid approach, a second control means for connecting said source directly across said element for high velocity approach and means for deactivating said second control means and activating said first control means responsive to initial contact between said electrode and workpiece.

6. In an apparatus for machining a conductive workpiece electrically across a fluid filled gap between a tool electrode and said workpiece including a motive means for providing relative movement between said electrode and workpiece, a servo feed system comprising an electrically energized element operatively connected to and controlling the operation of said motive means, means for providing an electrical voltage output to said element representative of gap spacing, said voltage output of a first level effective to provide normal velocity relative approach between said electrode and workpiece, a separate voltage source for impressing an additional voltage of a substantially higher level on said element of a polarity and a magnitude to provide high velocity approach, and means for connecting said source directly across said element on initial approach and for disconnecting it from across said element responsive to initial contact between said electrode and workpiece.

7. In an apparatus for machining a conductive workpiece electrically across a fluid filled gap between a tool electrode and said workpiece including a motive means for providing relative movement between said electrode and workpiece, a servo feed system comprising an electrically energized element operatively connected to and controlling said motive means, a first control means for providing a voltage output to said element representative of gap spacing, said output of a first level effective to provide normal velocity approach between said electrode and workpiece, a separate DC source of a polarity and magnitude of a substantially higher level to provide rapid approach, a second control means for connecting said source directly across said element for high velocity approach and means for activating said first control means and deactivating said second control means responsive to initial contact between said electrode and said workpiece.

References Cited

UNITED STATES PATENTS 3,370,147   2/1968   Matulaitis.

RICHARD M. WOOD, *Primary Examiner.*

R. F. STAUBLY, *Assistant Examiner.*